(12) United States Patent
Rey-Mermet et al.

(10) Patent No.: US 7,177,004 B2
(45) Date of Patent: Feb. 13, 2007

(54) CONNECTION MEANS FOR SETTING UP AN ELECTRIC CONNECTION BETWEEN A CELL, IN PARTICULAR A LIQUID CRYSTAL CELL, AND A POWER OR CONTROL CIRCUIT

(75) Inventors: Gilles Rey-Mermet, Le Landeron (CH); Rolf Klappert, Neuchatel (CH)

(73) Assignee: Asulab S.A., Marin (CH)

( * ) Notice: Subject to any disclaimer, the term of this patent is extended or adjusted under 35 U.S.C. 154(b) by 224 days.

(21) Appl. No.: 10/518,501

(22) PCT Filed: Jun. 17, 2003

(86) PCT No.: PCT/EP03/06375

§ 371 (c)(1),
(2), (4) Date: Dec. 20, 2004

(87) PCT Pub. No.: WO04/001490

PCT Pub. Date: Dec. 31, 2003

(65) Prior Publication Data

US 2005/0217720 A1     Oct. 6, 2005

(30) Foreign Application Priority Data

Jun. 21, 2002  (EP) .................................. 02077491

(51) Int. Cl.
*G02F 1/1345* (2006.01)

(52) U.S. Cl. ....................................... 349/149; 349/152
(58) Field of Classification Search ................ 349/149, 349/150, 151, 152
See application file for complete search history.

(56) References Cited

U.S. PATENT DOCUMENTS 4,643,526 A   2/1987  Watanabe et al.

(Continued)

FOREIGN PATENT DOCUMENTS

EP          0 708 931         5/1996

(Continued)

OTHER PUBLICATIONS

International Search Report, completed Sep. 1, 2003.

* cited by examiner

*Primary Examiner*—David Nelms
*Assistant Examiner*—David Chung
(74) *Attorney, Agent, or Firm*—Griffin & Szipl, P.C.

(57) ABSTRACT

The present invention concerns an electro-optical cell, in particular a liquid crystal display cell (2), or an electrochemical photovoltaic cell, including in particular a first transparent front substrate (4) and a second back substrate (6) which may or may not be transparent, said substrates (4, 6) being joined by a sealing frame that defines a volume (8) for retaining a sensitive material whose physical properties, particularly optical, or electrical properties are capable of changing, said substrates (4, 6) including on their faces opposite each other at least one electrode (14, 16), these electrodes (14, 16) being intended to be connected to an electrical power or control circuit, said cell (2) being characterised in that the sealing frame includes at least one wall (12) structured on one of the two substrates (4, 6) and which defines via its inner lateral face the volume (8) for retaining the sensitive material, the substrates (4, 6) being joined by a sealing frame (30), which occupies at least part of the gap (28) defined by said two substrates (4, 6) and the external lateral face of the wall (12), and in that the electrodes (14, 16) include contact bumps (20) made of an electrically conductive material added onto the extension of each electrode (14, 16) at the place where the latter emerges from the wall (12), so as to increase the surface of the lateral electrical contact zone via which each electrode (4, 6) of the cell (2) is connected to the electrical power or control circuit.

29 Claims, 5 Drawing Sheets

U.S. PATENT DOCUMENTS

| | | | |
|---|---|---|---|
| 6,498,636 B1 * | 12/2002 | Mathew et al. | 349/187 |
| 6,587,175 B1 * | 7/2003 | Ruedin et al. | 349/149 |
| 2001/0050748 A1 | 12/2001 | Lee | |

FOREIGN PATENT DOCUMENTS

| | | |
|---|---|---|
| EP | 0 936 496 A1 | 8/1999 |
| JP | 03 110518 A | 5/1991 |
| JP | 11 002822 A | 1/1999 |

CONNECTION MEANS FOR SETTING UP AN ELECTRIC CONNECTION BETWEEN A CELL, IN PARTICULAR A LIQUID CRYSTAL CELL, AND A POWER OR CONTROL CIRCUIT

This is a National Phase Application in the United States of International Patent Application No. PCT/EP03/06375 filed Jun. 17, 2003, which claims priority on European Patent Application No. 02077491.5, filed Jun. 21, 2002. The entire disclosures of the above patent applications are hereby incorporated by reference.

The present invention concerns connection means for setting up an electrical connection between an electro-optical cell such as a liquid crystal cell or an electrochemical photovoltaic cell and an external electronic power or control circuit. The invention also concerns a method for manufacturing such cells.

A first known category of photovoltaic cells converts light into electricity by exploiting the photovoltaic effect that appears at the junction of semi-conductor materials. The semi-conductor material fulfils both the function of light absorption and of separation of the resulting electrical charges (electrons and holes). The material has to be of great purity, free of any defects, otherwise electrons and holes are recombined before being able to be separated. The cost price of such cells is thus quite high.

The present invention concerns a second type of photo-voltaic cells called electrochemical cells, which include a semi-conductor material that is normally insensitive to visible light because of its forbidden bandwidth, and that only starts to absorb in the near ultraviolet. Such a material can nonetheless be sensitised by adsorption of a colouring agent such as a transition metal complex which allows a conversion rate between an incident photon and an electron close to one. After having been excited by the absorption of a photon, the colouring agent can transfer an electron into the conduction band of a semi-conductor material. The electric field prevailing within the semi-conductor material enables the electron to be extracted. After transferring the electron, the colouring agent returns to the fundamental oxidised state. Recombination between the electron in the conduction band of the semi-conductor material and the hole on the oxidised colouring agent is much slower than the reduction of the oxidised colouring agent by a mediator. Consequently, the charge separation is efficient.

The cells of the type described hereinbefore generally include a first transparent front substrate and a second back substrate, which generally can either be transparent or not. These two substrates each include on their faces that are opposite each other a first electrode also called the counter-electrode, and a second electrode usually called known as the photo-electrode. These electrodes are to be connected to an electrical supply circuit and are conventionally made in the form of a thin layer of a transparent conductive oxide such as a mixture of indium/tin oxide or antimony/tin oxide.

The two substrates are joined to each other by a sealing frame, which extends along the periphery of the latter. This sealing frame defines a sealed volume for retaining the semi-conductor material deposited in layers on one of the substrates and an electrolyte containing the aforementioned mediator.

The present invention also concerns so-called electro-optical cells, in particular liquid crystal cells, which, like electrochemical photovoltaic cells, include:

at least a first transparent front substrate whose top surface forms the front face of the cell;

at least a second back substrate which can also be transparent or not transparent, whose bottom surface forms the back face of said cell;

the substrates each including on their faces that are opposite each other at least one electrode, these electrodes being intended to be connected to a display control circuit, which, by applying appropriate electrical voltages to selected electrodes, is able to alter the transmission or reflection features of an optically active medium;

the substrates being joined by a sealing frame defining a sealed volume for retaining the optically active medium, and connection means for setting up or establishing the electrical connection between each electrode and the display control circuit.

A constant problem in the field of electrochemical photovoltaic cells of the type described hereinbefore, is raised by the connecting means that are used to establish the electrical connection between the electrodes of the cell and an electric power circuit. This problem is also encountered with electro-optical display cells where the electrodes of the cell have to be connected to the device generating the electrical control signals that alter the optical features of the sensitive material retained between the substrates of the cell.

In fact, the most frequently used technique for making the connection pads which enable the electrodes of such cells to be connected to an electronic power or control circuit, consists in letting the connection pads emerge along at least one edge of the cell where the substrate which carries the electrodes projects with respect to the other substrate. This solution thus involves having to offset the substrates of the cell in relation to each other, in order to be able to access the electrodes and make the electrical connections. Such an arrangement makes it difficult to manufacture the cells on a large scale, particularly when the latter are circular, and it requires additional glass scribing and breaking operations which are time consuming.

In order to overcome these problems, the Applicant in his EP Patent Application No A1-0 936 496 has provided a first solution. This European Patent Application discloses an electrochemical photovoltaic cell wherein each of the two substrates of the cell carries on most of its surface a transparent electrode. Contact bumps, made of an electrically conductive material, are added to each electrode in the lateral contact zone where the latter is flush with the edge of the substrate on which it has been deposited.

Owing to the features of the invention briefly described hereinbefore, it is possible to increase the surface of the electrical contact lateral zone via which each electrode of the cell is connected to the electric power or control circuit. The electrical connection between the electrodes and the electrical power or control circuit is thus much more reliable.

However, deposition of the sealing frame is carried out by screen printing, a technique that consists, let us recall, in depositing a material of paste-like consistency through the unobstructed mesh of a screen, for example made of nylon or stainless steel, with a very fine mesh using a squeegee that is actuated by hand or mechanically. There are two major drawbacks with the techniques for depositing sealing frames by screen printing. The first of these drawbacks lies in the fact that it is difficult to control with precision the final dimensions of the frames. In fact, when the top substrate is applied onto the bottom substrate, the sealing material is compressed and tends to spread out via the effect of the pressure exerted, such that the width of the sealing frame can only be controlled with a precision typically of the order of a tenth of a millimeter. Moreover, the inner wall of the sealing frames deposited by screen printing which is in contact with the liquid crystal usually has irregularities in shape, such that these frames have to be arranged at a sufficient distance from the electrodes to prevent them from overlapping thereon. Such a situation may be acceptable if there is a large enough space between the edges of the cell from where the connections emerge and the actual active zone of the cell. However, as soon as one tries to reduce the dimensions of the dead zone reserved for the connector technology, in order to optimise the surface of the display zone of the cell or to answer problems of bulkiness, the precision offered by screen printing techniques is no longer sufficient.

The other drawback of screen printing deposition techniques lies in the fact implementing these techniques generates not insignificant mechanical stresses which are often harmful to the neighbouring structures that have already been deposited when the screen printing step takes place. In order to preserve these fragile structures, it is preferable to deposit them after deposition of the sealing frame. This is the case in European Patent Application No. A-1-0 936 496 where the contact bumps are deposited on the corresponding electrodes by means of a syringe type dispenser. But this technique is inaccurate and considerably limits the number of contact bumps that it is possible to make on the same cell, which means that use of this technique is reserved for cells having low connection density.

There is also known from European Patent No. EP-B1-0 708 931 in the name of the South Korean company Samsung Electronics Co. Ltd., a liquid crystal cell with a thin sealing frame and a method of manufacturing such a cell. In accordance with this method, a cord of sealing material is deposited on the periphery of a first substrate whose dimensions are larger than those of the desired liquid crystal cell. A second substrate of the same dimensions as the first substrate is then deposited on said first substrate so as to create a cavity defined by the first and second substrates and the sealing cord. After which, the sealing material is solidified so as to join the two substrates, then the cavity is filled with the liquid crystal via a filling aperture which is then blocked. Finally, the assembly of the two substrates is sawn through the sealing material to return it to the dimensions of the desired display cell.

In the Samsung Patent, the sealing cord is deposited using a syringe type dispenser. Thus, the contact bumps must be less high than the space separating the two substrates of the cell since, if this is not the case, there is a risk of extra thick areas being observed at the places where the sealing material covers said contact bumps, such extra thick areas being unacceptable insofar as they involve parallelism defects between the two substrates meaning that the cell is not sealed. Further, as the contact bumps are not high, they must be wide in order to offer a sufficient electrical contact surface area, which considerably limits the number of electrodes that it is possible to connect and thus the resolution of the display thereby obtained.

It is an object of the present invention to overcome the drawbacks of the aforementioned prior art in addition to others still, by providing an electro-optical cell, in particular a liquid crystal display cell, or an electrochemical photovoltaic cell including connection means for setting up a reliable and compact electrical connection between the electrodes of the cell and an electric power or control circuit.

The present invention also concerns a method of manufacturing a cell of the aforementioned type, which is easy to implement and which limits especially the risk of deterioration of the cell elements that have already been deposited.

The present invention thus concerns an electro-optical cell, in particular a liquid crystal display cell, or an electrochemical photovoltaic cell, including:

at least a first transparent front substrate whose top surface forms the front face of the cell;

at least a second back substrate which can also be transparent or not transparent, whose bottom surface forms the back face of said cell;

the substrates being joined by a sealing frame defining a sealed volume for retaining sensitive material whose physical properties, particularly optical, or electrical properties are capable of changing, the substrates each including on their faces that are opposite each other at least one electrode, these electrodes being intended to be connected to an electrical power or control circuit;

the electrodes of the cell extending substantially as far as the edges of the cell to form connection means in order to set up the electrical connection between said cell and the power or control circuit;

this cell being characterised in that the sealing frame includes at least one wall structured on one of the two substrates and which defines via its inner lateral face the volume for retaining the sensitive material, this wall extending in a set back position with respect to the edges of the cell, so as to free the connection contacts and thus with the electrodes passing through the wall, the substrates being joined by a sealing joint, which occupies at least partly the gap defined by said substrates and the outer lateral face of the wall, and in that the electrical connection means include contact bumps made of an electrically conductive material added onto the extension of each electrode at the place where the latter emerges from the wall.

Owing to these features, it is possible to increase the surface of the lateral electrical contact zone via which each electrode of the cell is connected to the electrical power or control circuit. The electrical connection between the electrodes and the power or control circuit is thus much more reliable. Moreover, the fact that the sealing frame is formed of two parts, namely a wall which defines a volume for retaining the sensitive material and a cord of sealing material that is deposited against the external face of the wall and which fills the gap left vacant between the two substrates because of the fact that said wall is structured slightly further back than the edges of the cell, enables the dimensions of the dead zone reserved for the connection of the cell to be substantially reduced and thus the surface of the display zone of said zone to be optimised or its space requirement to be reduced. Finally, the sealing material covers the contact bumps, which prevents any risk of the bumps deteriorating.

According to another aspect, the present invention also concerns a method of manufacturing at least one cell of the aforementioned type, this method being characterised in that it includes the steps of:

structuring the corresponding electrodes on each of the substrates;

depositing a contact bump made of an electrically conductive material on each electrode, in the region where the electrodes will be flush with the edges of the cell, structuring at least a wall on at least one of the substrates, which defines, via its inner lateral face, the volume for retaining the sensitive material;

joining the second substrate to the first substrate;

introducing a sealing material capable of flowing into the gap defined by said substrates and the external lateral face of the wall until at least a part of said gap is occupied by the sealing material; and solidifying the sealing material so that the latter forms the sealing frame of the cell thereby obtained.

Other features and advantages of the present invention will appear more clearly from the following detailed description of an example embodiment of the cell according to the invention, this example being given solely by way of non-limiting illustration, in conjunction with the annexed drawing, in which.

The present invention proceeds from the general inventive idea, which consists in making the sealing frame for a cell, for example a liquid crystal cell, in two parts, namely, a wall that can be made very precisely in proximity to the edges of the cell and which defines, via its inner lateral face, a volume for retaining a sensitive material such as a liquid crystal, and a sealing joint which is introduced into the gap between the two substrates and which gives the resulting sealing frame its mechanical resistance and its adhesion power for said substrates. It is thus possible to reduce the space necessary for making the electrodes emerge of the cell, such that a more compact cell is obtained or one offering a larger active surface. In fact, as it has been difficult until now to deposit a sealing frame with precision, the latter had to be arranged sufficiently far from the edges of the cell to be sure that the electrodes would emerge properly from said sealing frame, which resulted in a considerable reduction in the active surface of the cell. Moreover, since the sealing material covers the conductive bumps arranged at the end of the conductive paths, this prevents any risk of said connecting means being damaged.

The present invention will be described in conjunction with a liquid crystal display cell. It goes without saying that this example is given solely by way of illustrative example, and that the present invention applies in a similar way to any type of electro-optical or electrochemical photovoltaic cell.

Figure 1:
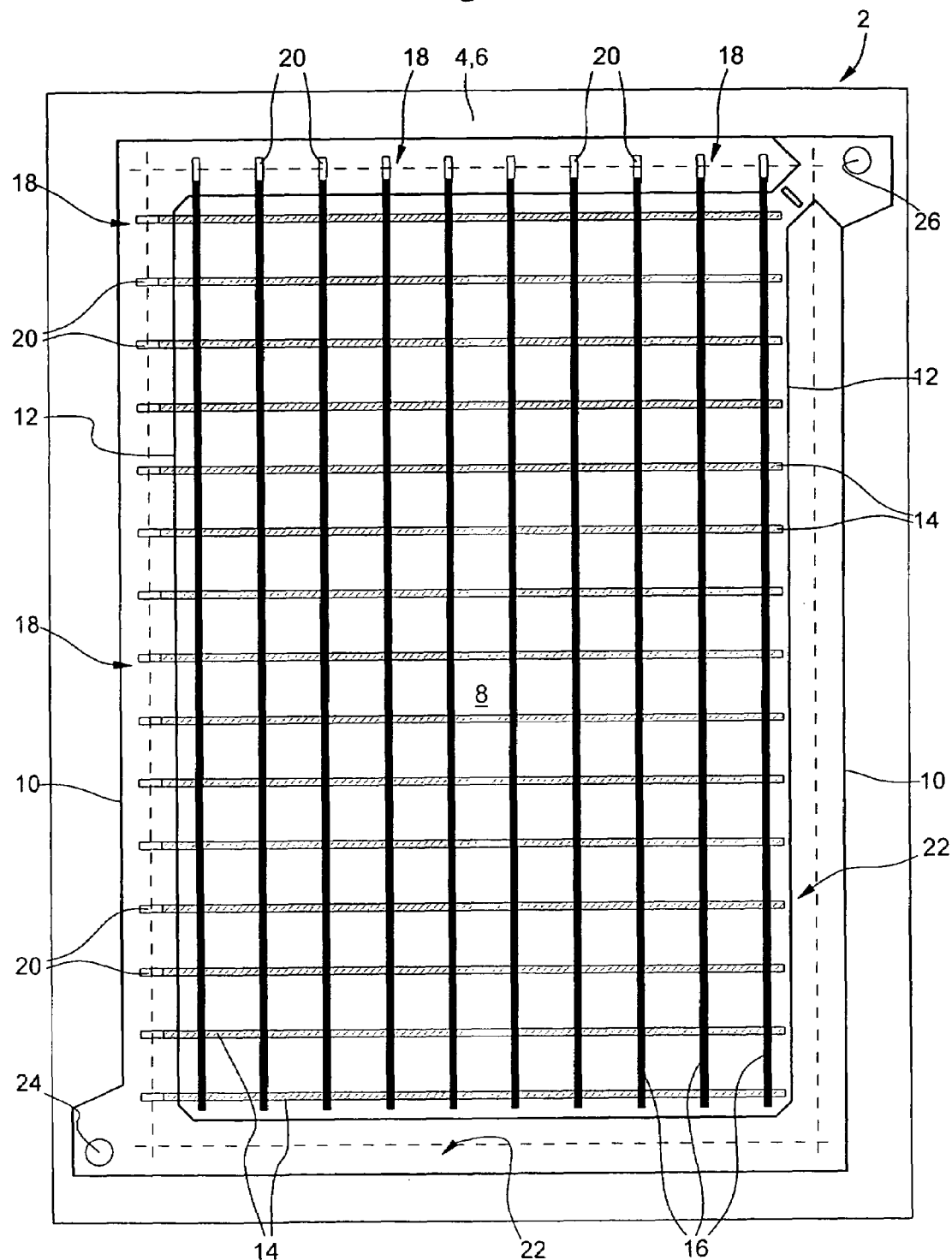
FIG. 1 is a top view of a cell on which there is shown a filling channel for receiving a fluid sealing material for forming the sealing frame of the cell and the corresponding feed hole for the sealing material.

FIG. 1 is a plan view of a liquid crystal cell 2 during manufacture, this cell being formed by an assembly of two superposed substrates 4 and 6, for example glass substrates, whose front substrate 4 is transparent, whereas the back substrate 6 may also be transparent, or not transparent.

It can be seen in FIG. 1 that cell 2 defines a cavity 8 for enclosing the liquid crystals, this cavity 8 being defined by substrates 4 and 6 and by sealed walls 10 and 12 for receiving a sealing material, which fixes said substrates 4 and 6 to each other as will be described in detail hereinafter. Front substrate 4 and back substrate 6 also carry a multiplicity of electrodes 14 and counter-electrodes 16 respectively. As can be seen in FIG. 1, these electrodes 14 and counter-electrodes 16 are substantially rectilinear and extend perpendicularly to each other. These electrodes 14 and 16 shown in an exaggeratedly thin manner in order to make the drawing more comprehensible, are to be connected to an electronic control circuit (not shown) which, by application of appropriate electrical voltages to selected electrodes, is able to alter the transmission or light reflection features of the compound formed by the liquid crystal at the point of intersection of the electrodes concerned. Of course, the shape and number of electrodes shown in the drawing are give solely by way of illustration, since numerous other arrangements of such electrodes can evidently be envisaged.

Electrodes 14 and 16 of cell 2 extend up to close to the edge of substrates 4 and 6 on which they are deposited to form connecting means 18 in order to set up the electrical connection between said cell 2 and the control circuit. However, wall 12 extends set back from the edges of the cell, so as to release connecting means 18, and thus electrodes 14 and 16 pass through it.

Figure 2:
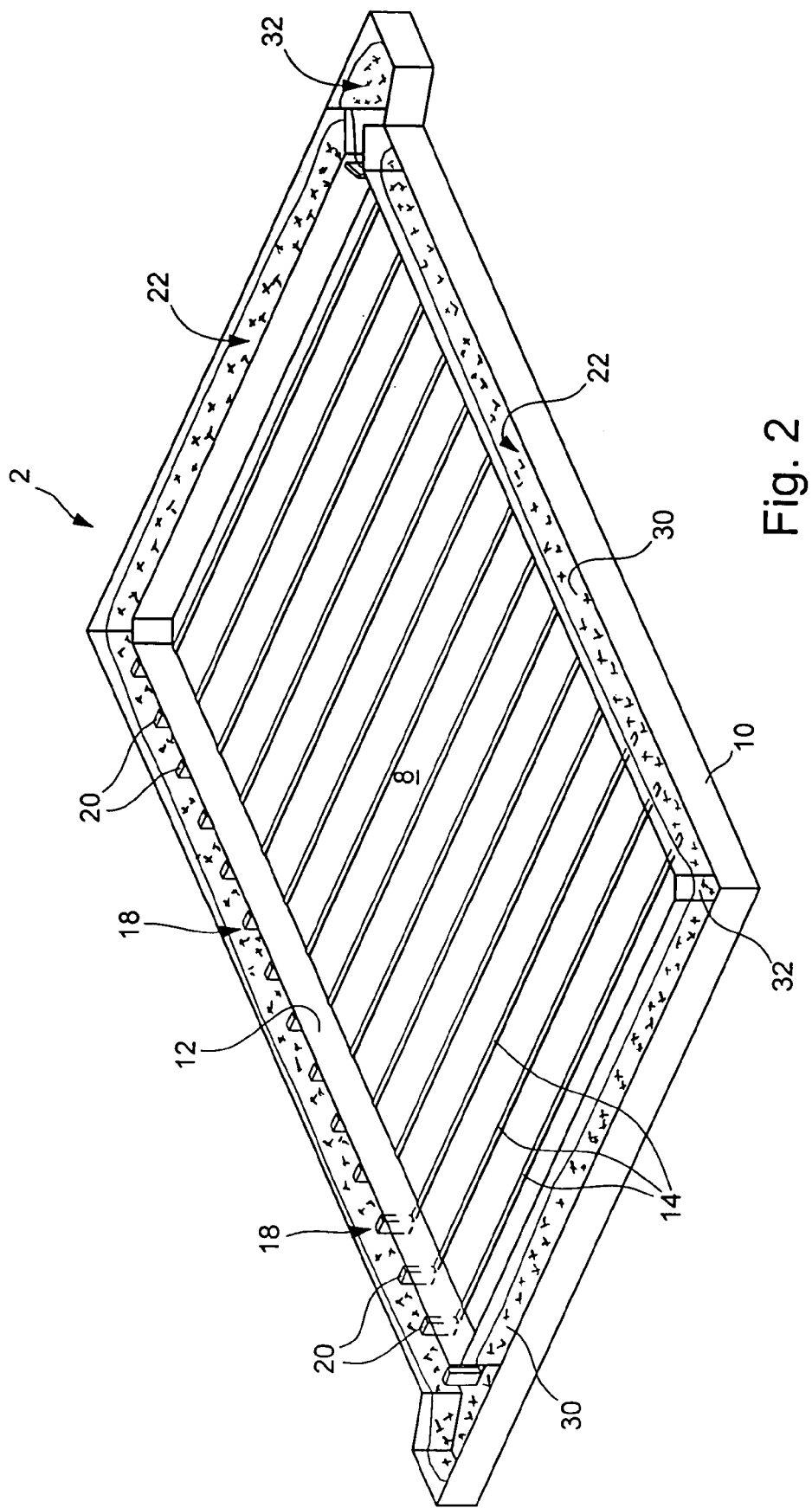
FIG. 2 is a perspective view of the cell shown in FIG. 1, the top glass substrate having been omitted for the sake of clarity.

Connecting means 18 are formed by contact bumps 20 (more visible in FIGS. 2 and 3) made of an electrically conductive material added onto the extension of each of electrodes 14 and 16 at the place where they emerge from wall 12. Owing to these contact bumps 20, it is possible to increase the surface of the lateral electrical contact zone via which each electrode 14 or 16 is connected to the electronic control circuit. The electrical connection between electrodes 14 and 16 and the control circuit is thus much more reliable.

According to one feature of the invention, contact bumps 20 are not as high as the space separating the two substrates 4 and 6 and which is determined by the height of the sealing frame which connects the two substrates to each other.

In the example shown in FIG. 1, it can be seen that sealed wall 10 follows an external contour between the two superposed glass substrates 4 and 6, whereas wall 12 follows the internal contour of liquid crystal cell 2, such that outer wall 10 surrounds inner wall 12. Thus, these walls 10 and 12 which take the form of substantially vertical walls extending parallel and at a distance from each other are in direct contact, one 10, with the external atmosphere and the other 12, with the liquid crystal. They advantageously for a filling channel 22 which can be seen in FIG. 1 and better still in FIG. 2, this channel 22 is to be filled with a sealing material to form the sealing frame of cell 2. Thus, at least one hole 24 for supplying the sealing material, is made in front substrate 4 and it communicates with filling channel 22, whereas a hole 26 for filling cavity 8 with the liquid crystal is also pierced in said front substrate 4. As filling channel 22 can be very long as a function of the geometry of cell 2, it could be separated into two or several channels isolated from each other by wall elements and each filled via a corresponding filling hole 24. Of course, according to a variant, one could also make at least one filling hole in external wall 10.

Figure 3:
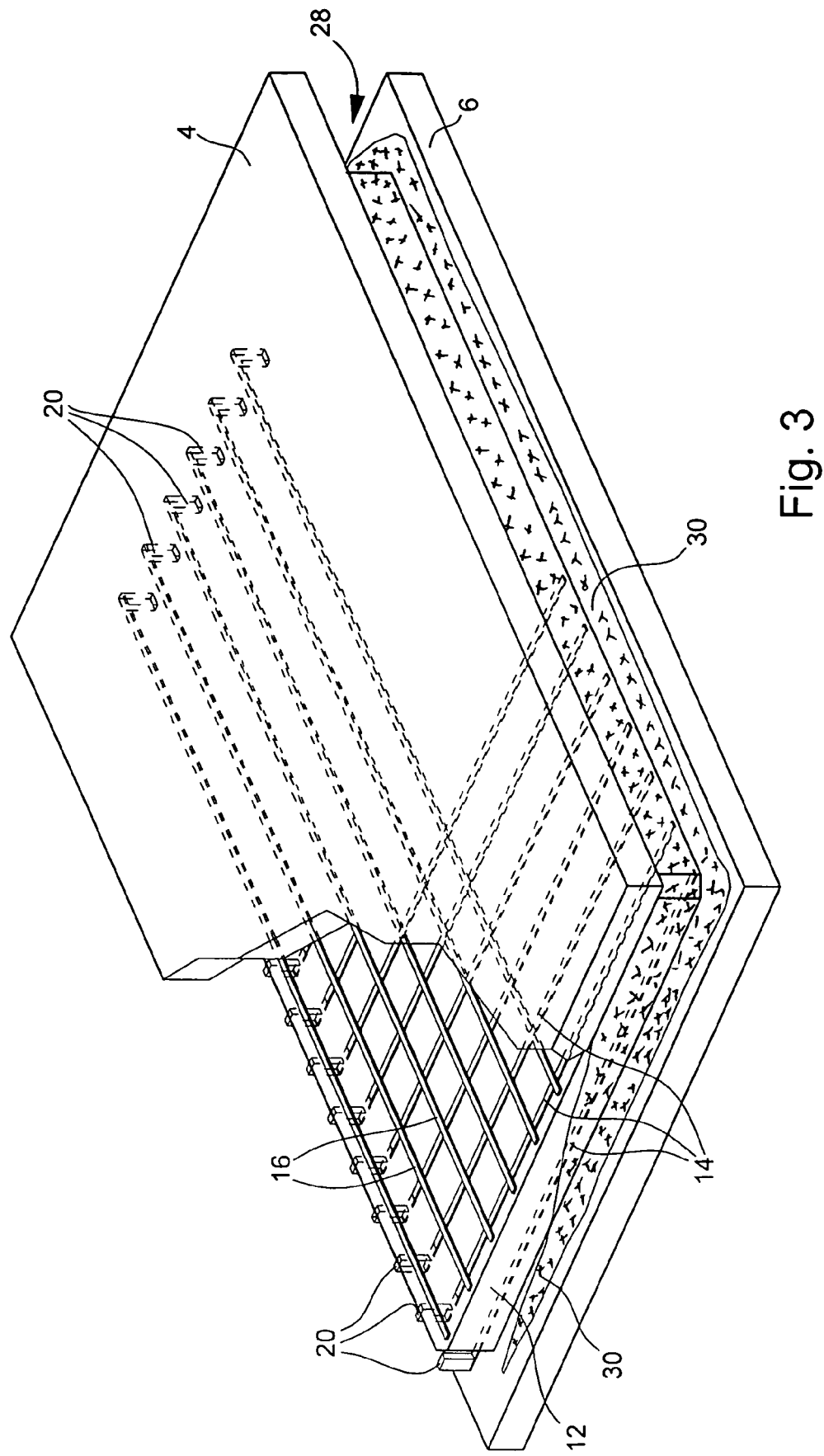
FIG. 3 is a perspective view with the top substrate partially torn away, showing the volume defined by the two superposed substrates and the external face of a wall made in accordance with the method according to the invention.
Figure 4:
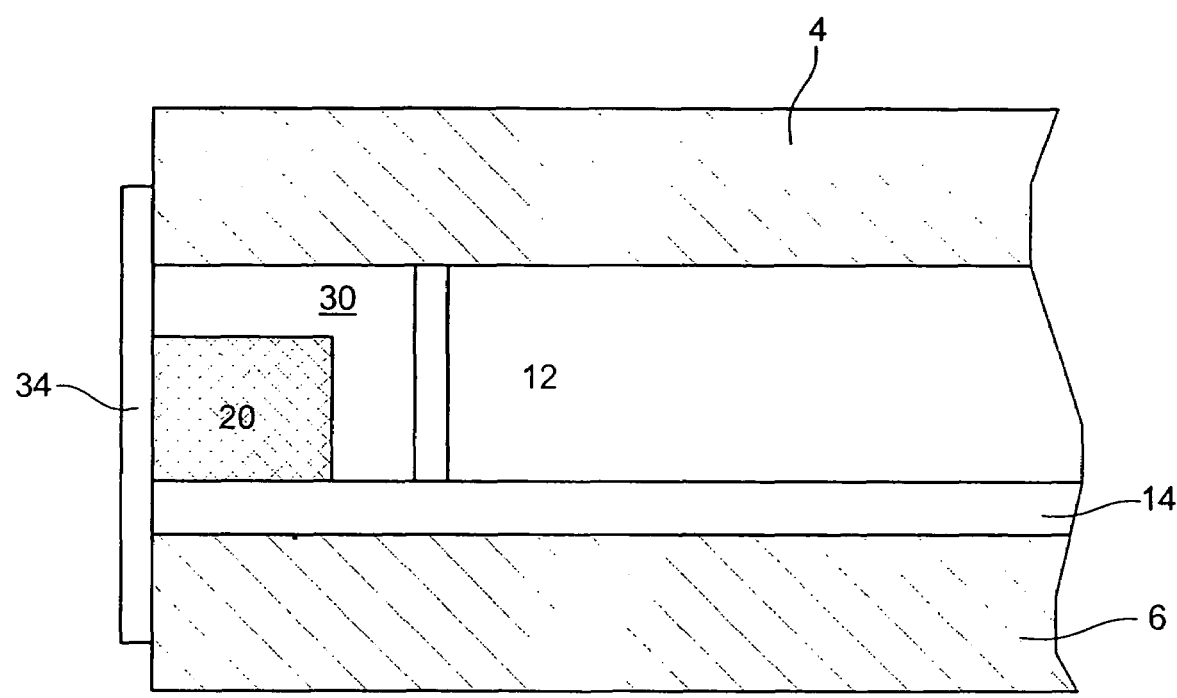
FIG. 4 is a cross-section of the cell shown in FIG. 3.

It is clear, of course, that wall 10 can be omitted, only wall 12 which is in contact via its inner lateral face with the liquid crystal being kept. In such case, after structuring said wall 12 and positioning top substrate 4 on bottom substrate 6, the sealing material will be introduced into gap 28 defined by the outer lateral face of wall 12 and the two superposed substrates 4 and 6 until at least a part of the volume of said gap 28 is occupied by said sealing material as shown in FIG. 3.

This operation could be achieved by means of a sealing material dispenser. The dispenser will be moved along at least a part of the periphery of the two substrates 4 and 6, so as to form a cord of sealing material 30, which, by abutting against the external lateral face of wall 12 and joining said two substrates 4 and 6, will form the sealing frame. It is not necessary for the sealing frame 30 to extend as far as the edges of the cell. It only needs to be sufficiently wide to play the part of a sealing frame, i.e. to isolate the sensitive material from the external environment, to prevent the latter from leaking outside the cell and to keep the two substrates 4 and 6 together.

In order to deposit the cord of sealing material 26, one can also dip one of the edges of cell 2 defined by the two superposed substrates 4 and 6 into a receptacle containing a certain quantity of the sealing material. By capillary action, the sealing material will gradually fill the vacant volume 28 located outside the perimeter of wall 12. Another possibility consists in injecting the sealing material between the two substrates 4 and 6 via a filling hole pierced in one of said substrates 4 or 6 outside the perimeter of wall 12.

According to the invention, after having deposited all of the structures necessary for the proper operation of the forthcoming cell 2 on the inner face of one of the two substrates 4 or 6, such as for example the electrodes or the contact bumps (these manufacturing steps will be described in detail hereinafter), the substrate is covered with a layer of photoresist material. This photoresist layer is then structured by conventional photo-etching techniques to give it the form of the aforementioned filling channel 22 defined by walls 10 and 12. Once filling channel 22 has been obtained, the remaining substrate, also suitably primed, is joined to the first substrate. Of course, the order of these operations is given purely by way of illustration, and could be altered.

According to a variant of the method, the photoresist layer is structured so as to form not only the filling channel, but also spacers (not shown in the drawing for the sake of clarity) for maintaining a constant distance between the two substrates 4 and 6. Owing to the present invention, it is thus possible to structure the distance structures and the filling channel in a single manufacturing step. In addition to the savings in time and money achieved by such a method, another advantage of this implementation variant of the method according to the invention lies in the fact that, since the spacers and the sealing frame are made in a concomitant manner, said spacers are not liable to be damaged during a subsequent step for manufacturing the sealing frame as was the case in the prior art. Finally, the filling channel and the spacers are made using the same material, which simplifies the present method still further.

The photolithographic techniques used within the scope of the present invention are of a conventional type and are well known to those skilled in the art. They consist, essentially, in sensitising the photoresist layer by means of a light passing through the transparent zones of a mask reproducing the shapes of the zones to be sensitised. As regards the photoresist material, this is also, in a very conventional manner, a photosensitive resin that those skilled in the art will be able to choose without any difficulty, and whose usual purpose is to protect the surface of the layer to be etched from the action of a chemical reactant at the locations where the resin subsists after sensitisation by the optical radiation and chemical removal of the zones covering the places to be etched. One can cite the photosensitive cycloten from Dow Chemical and the product marketed under the reference SU8 by MicroChem Corp. as materials well suited for making walls 10 and 12.

As was described hereinbefore, after structuring the sealed walls 10 and 12 defining filling channel 22 and, where appropriate, spacers, the two substrates 4 and 6 are joined. Said channel 22 can then start to be filled. In order to do this, a vacuum starts to be made in the working enclosed space in which cell 2 is made. Once the vacuum is established, a drop of sealing material is deposited above hole 24 which communicates with filling channel 22. By capillary action, the sealing material starts to flow into channel 22. Then the atmospheric pressure is re-established in the working enclosed space. Via the effect of the pressure difference between the filling channel in which a quite high vacuum prevails and the atmospheric pressure, the sealing material is driven to the bottom of the filling channel.

Typically, the material used for sealing cell 2 is a photosensitive resin which is introduced in the liquid state into filling channel 22 and which is then polymerised by sensitisation using an ultraviolet light through top substrate 4. The sealing material has to hermetically seal the edges of cell 2 in order to efficiently retain the liquid crystal and protect it from gas diffusion phenomena from the ambient atmosphere. The sealing material must also have an adhesive power in order to enable it to hold the two substrates 4 and 6 together. By way of variant, the sealing material can also be formed by a resin which will polymerise via the effect of a rise in temperature in the working enclosed space. A dual component adhesive whose components harden over time or via the effect of a rise in temperature when they are put in each other's presence can also be used as sealing material. The products Loctite 3492 and Norland Optical Adhesives 61 can be cited as materials well suited for making the sealing frame. Another family of adhesives well suited to the requirements of the present invention is formed by the cyanoacrylate adhesives. Finally thermoplastic resins can also be used within the scope of the invention.

Once the sealing material has been introduced into filling channel 22 then solidified, the liquid crystal can be introduced into cell 2 via filling hole 26. Advantageously, the introduction of the sealing material, its solidification, then the step of introducing the liquid crystal can be carried out one after the other or simultaneously in the same machine. Finally, liquid crystal filling hole 26 is blocked as well as space 32 in immediate proximity to filling hole 26, in order to achieve sealing continuity with the closest parts of wall 12 so that the whole of the periphery of cell 2 is perfectly sealed. Finally, additional layers such as polarisers can also be deposited on substrates 4 and 6.

Electrodes 14 and 16 are usually made by photo-etching in the form of thin layers of a transparent conductive oxide such as a mixture of indium/tin oxide or "ITO". After the step of structuring electrodes 14, 16, comes the step of making contact bumps 20. Of course, according to a variant, it would also be possible to first of all deposit a layer of conductive material, then to make the contact bumps at the surface of that layer, and finally to structure the conductive layer in order to form the electrodes.

Contact bumps 20 are preferably, but not restrictively, made by galvanic growth using a conductive material such as gold. Thus, a layer of gold is deposited by vapour deposition over the entire surface of the two substrates 4 and 6. Prior to the disposition of the gold layer a chromium layer for example could be vapour deposited on the surface of substrates 4 and 6, which allows a better adhesion of said gold layer at the surface of substrates 4 and 6. The layer of gold is commonly called the seed layer.

After evaporation of the gold layer, there is deposited a layer of a photoresist agent in which apertures are made at the places where one wishes the galvanic growth phenomenon to occur, in other words at the end of electrodes 14 and 16. The layer of growth will be electrically contacted to form the cathode, then substrates 4 and 6 will be immersed in a galvanic growth bath opposite a platinum piece which acts as the anode. The bath is a dual gold and potassium cyanure base marketed under the commercial name of AURALL 292 by the Lea Ronal Company. Via the effect of application of an electrical voltage, the electrochemical couple present in solution in the galvanic growth bath will dissociate and the gold will be deposited on the locations of substrates 4 and 6 that are not protected by the photoresist layer. As a function of the value of the electrical voltage and the time during which the voltage is applied, the speed of growth of contact bumps 20 can be controlled. When these contact bumps 20 have reached the desired dimensions, the electrical voltage is cut. Substrates 4 and 6 then only need to be dipped in the chemical etching baths to successively remove the layers of photoresist, gold and chromium. When the gold layer is removed, contact bumps 20 will also be slightly etched and their height will decrease by a value close to that of the thickness of the gold layer initially deposited on substrates 4 and 6. It should be noted that these different chemical etches have no effect on electrodes 14, 16 which are made of ITO.

According to a variant, contact bumps 20 can be made using a selective printing deposition technique such as screen printing using an adhesive material like epoxy charged with conductive particles.

After structuring contact bumps 20, liquid crystal molecule alignment layers are deposited on substrates 14, 16. These alignment layers can be deposited for example by flexographic printing.

After the alignment layers have been deposited, holes 24 and 26 for introducing the sealing material and the liquid crystal are pierced in one of the substrates, here front substrate 4.

The wall or walls 10 and 12 are then structured in accordance with the operating mode described in detail hereinbefore. At the same time as walls 10 and 12, one can, if appropriate, simultaneously make the distance structures, for example in the form of rectilinear bars or bumps.

Once walls 10 and/or 12 have been structured, front substrate 4 can then be applied onto back substrate 6 and filling channel 22 can start to be filled. If only inner wall 12 has been made, the gap 28 defined by the external lateral face of wall 12 and the two superposed substrates 4 and 6 can be filled, for example by dipping one of the edges of cell 2 into a receptacle containing liquid sealing material. By capillary action, the sealing material will gradually fill gap 28 and cover contact bumps 20 without any risk of damaging them. If, however, both inner wall 12 and outer wall 10 have been structured at the same time, so as to form the aforementioned filling channel 22, the sealing material will be introduced into said channel 22 via filling hole 24 arranged in front substrate 4 for this purpose.

Once the sealing material has solidified and the two substrates 4 and 6 are permanently joined, cavity 8 can be filled with the liquid crystal via filling hole 26 pierced in top substrate 4 then, when filling has finished, said filling hole 26 is sealed by means of an adhesive plug, all of these operations being able to be carried out simultaneously in the same machine.

At this stage of the manufacturing method, cell 2 is cut out, for example by sawing or water jet cutting, an operation that can be followed by a grinding step to bring the dimensions of cell 2 to its definitive size. The saw line is shown in dotted lines in FIG. 1. It will be noted that, in the example shown in the drawing, it passes through contact bumps 20 so that the cell has a regular contour with lateral contact zones bumps embodied by said bumps 20 having a large active surface. Conductive paths 34 can then be evaporated on the edge of cell 2 though the apertures of a mask, such paths will be used to connect contact bumps 20, in other words electrodes 14, 16, to the input terminals of an electronic control circuit (not shown) for example by means of conductive wires (also not shown) which will enable contact to be made easily on the edge of said cell 2.

It goes without saying that the invention is not limited to the embodiments that have just been described, and that various simple alterations and variants can be envisaged without departing from the scope of the present invention. In particular, the invention applies identically to a cell including more than two substrates, for example four, the substrates being joined in pairs by a sealing frame according to the invention and formed of at least one wall which defines the volume for retaining the sensitive material or fluid, as well as a cord of sealing material which fills the gap between the two substrates concerned, bumps of conductive material being added onto the extension of each electrode at the location where the latter emerges from said wall.

Likewise, it would be entirely possible to envisage the contact bumps being located outside the perimeter defined by the sealing cord.

Figure 5:
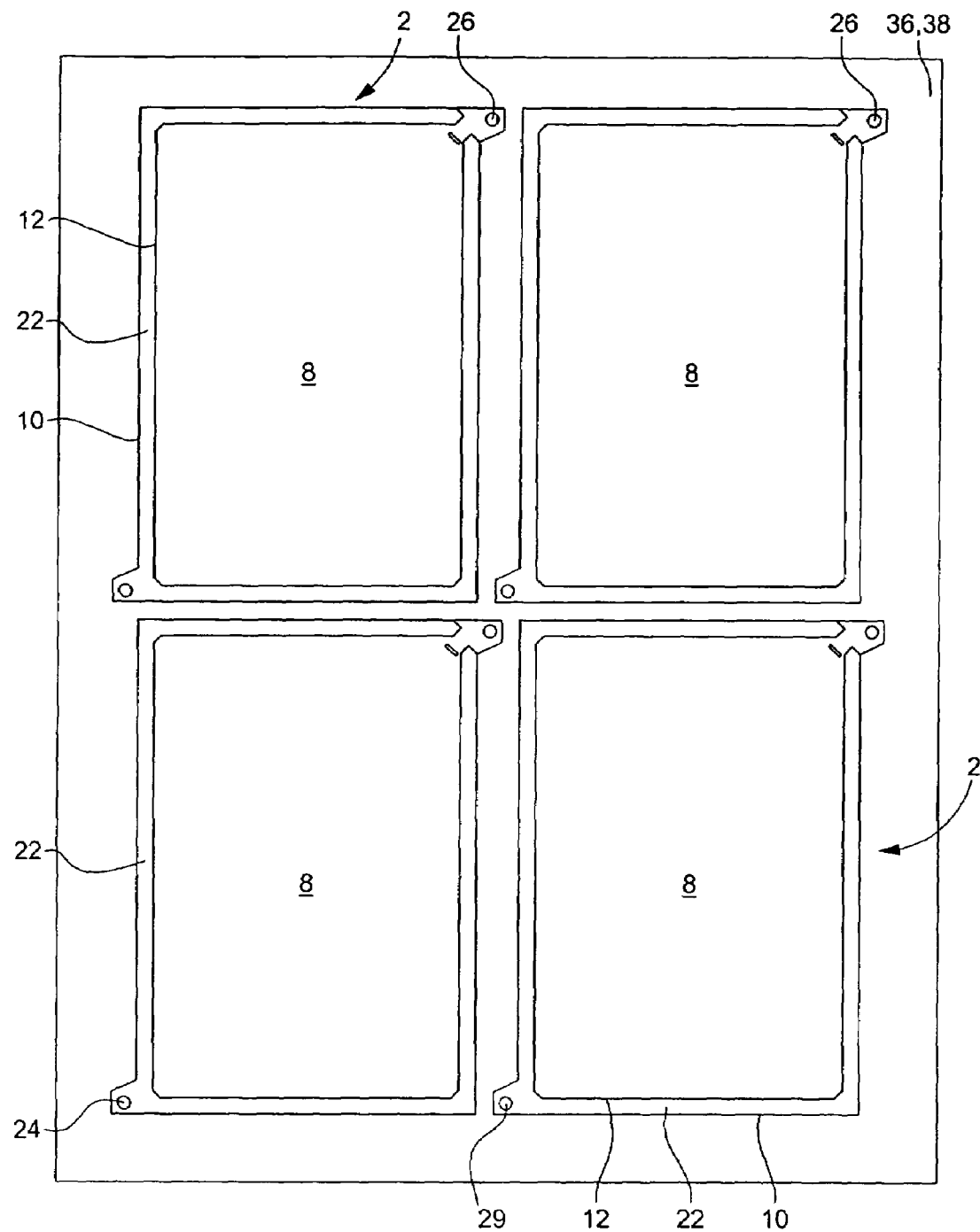
FIG. 5 is a schematic diagram of a batch of cells according to the invention.

Finally, the present invention applies in a similar manner to a large-scale manufacturing method for cells as shown in FIG. 5. Such a batch of cells 2 includes two plates 36 and 38 common to all of cells 2 and a network of sealed walls 10 and 12 defining, for each cell 2, a cavity 8 for enclosing the liquid crystals as well as the filling channels which are to be filled with a sealing material to connect the two plates 36 and 38 to form the sealing frames. Advantageously, a first plurality of holes 26 for filling cavities 8 with liquid crystal, and a second plurality of holes 24 for supplying the sealing material are made in upper plate 36. Owing to this feature, it is possible to fill the filling channels, not through the side, for example of liquid crystal cells, but from the top of the latter. One can thus work with a complete batch of cells, without being obliged to divide the batch into strips to be able to have access to the filling holes that are usually arranged on one of the sides of the cells. Cells 2 can thus be practically finished in batches prior to cutting. In particular, supply holes 24 can be filled and sealed with the sealing material for forming the sealing frames of the cells for the entire batch, thus in a simpler and more economical manner than with individual cells. Likewise, cells 2 can be filled with liquid crystal and filling holes 26 blocked while the cells are still in batches.

The invention claimed is:

1. A method of manufacturing an electro-optical cell, in particular a liquid crystal cell, or an electrochemical photovoltaic cell including:

at least a first transparent front substrate whose top surface forms the front face of the cell;

at least a second back substrate which may or may not be transparent and whose bottom surface forms the back face of said cell;

the substrates being joined by a sealing frame which defines a volume for retaining sensitive material whose physical properties, particularly optical, or electrical properties are capable of changing, the substrates including on their faces that are opposite each other at least one electrode, said electrodes being intended to be connected to an electrical power or control circuit; and the electrodes of the cell extending substantially as far as the edges of the cell to form connection means in order to set up the electrical connection between said cell and the power or control circuit, wherein said method includes the steps of:

structuring the corresponding electrodes on each of the substrates;

depositing a contact bump made of an electrically conductive material on each electrode, in the region where the electrodes will be flush with the edges of the cell, structuring at least one wall on one of the substrates, which defines, via its inner lateral face, the volume for retaining the sensitive material, said wall extending in a set back position with respect to the edges of the cell, so as to free the connection contacts, and thus with the electrodes passing through it;

joining the second substrate to the first substrate;

introducing a sealing material capable of flowing into the gap defined by said substrates and the external lateral face of the wall until at least a part of said gap is occupied by the sealing material; and solidifying the sealing material so that the latter forms the sealing frame of the cell thereby obtained.

2. The method according to claim 1, wherein it further includes the step of cutting the cell such that it has a substantially flat edge with lateral contact zones having a large active surface.

3. The method according to claim 1, wherein the sealing material penetrates the gap by capillary action.

4. The method according to claim 2, wherein the sealing material penetrates the gap by capillary action.

5. A method of manufacturing at least one electro-optical cell, in particular a liquid crystal cell, or an electrochemical photovoltaic cell including:

at least a first transparent front substrate whose top surface forms the front face of the cell;

at least a second back substrate which may or may not be transparent and whose bottom surface forms the back face of said cell;

the substrates being joined by a sealing frame which defines a volume for retaining sensitive material whose physical properties, particularly optical, or electrical properties are capable of changing, the substrates including on their faces that are opposite each other at least one electrode, said electrodes being intended to be connected to an electrical power or control circuit; and the electrodes of the cell extending substantially as far as the edges of the cell to form connection means in order to set up the electrical connection between said cell and the power or control circuit, wherein said method includes the steps consisting in:

structuring the corresponding electrodes on each of the substrates;

depositing a contact bump made of an electrically conductive material on each electrode, in the region where the electrodes will be flush with the edges of the cell, structuring, on one of the substrates, at least one filling channel defined by two walls which extend at a distance from each other and between which the contact studs are arranged;

joining the second substrate to the first substrate;

introducing a sealing material capable of flowing into the filling channel until the entire volume of said filling channel is occupied by the sealing material;

solidifying the sealing material so that the latter forms the sealing frame, and cutting the cell so that the latter has a substantially flat edge with lateral contact zones having a large active surface.

6. The method according to claim 5, wherein a batch of cells is made including two plates common to all of the cells and a network of walls defining, for each cell, a volume for retaining the sensitive material as well as filling channels, which are for filling with a sealing material in order to connect the two plates and form the sealing frames for said cells.

7. The method according to claim 6, wherein a first plurality of holes for filling the volumes with the sensitive material and a second plurality of holes for supplying the sealing material are made in one of the plates.

8. The method according to claim 5, wherein the sealing material penetrates the gap or the filling channel by capillary action.

9. The method according to claim 6, wherein the sealing material penetrates the gap or the filling channel by capillary action.

10. The method according to claim 7, wherein the sealing material penetrates the gap or the filling channel by capillary action.

11. The method according to claim 8, wherein it includes the steps of:

creating a vacuum in the filling channel;

making the sealing material penetrate said filling channel, and re-establishing the pressure outside the cell such that, via the effect of the pressure difference between the filling channel in which the vacuum prevails and the environmental pressure, the sealing material is driven to the bottom of the filling channel.

12. The method according to claim 9, wherein it includes the steps of:

creating a vacuum in the filling channel;

making the sealing material penetrate said filling channel, and re-establishing the pressure outside the cell such that, via the effect of the pressure difference between the filling channel in which the vacuum prevails and the environmental pressure, the sealing material is driven to the bottom of the filling channel.

13. The method according to claim 10, wherein it includes the steps of:

creating a vacuum in the filling channel;

making the sealing material penetrate said filling channel, and re-establishing the pressure outside the cell such that, via the effect of the pressure difference between the filling channel in which the vacuum prevails and the environmental pressure, the sealing material is driven to the bottom of the filling channel.

14. The method according to claim 1, wherein a layer of photoresist material is deposited on one of the substrates, said layer will then be structured by photo-etching techniques to give it the shape of one or several walls.

15. The method according to claim 5, wherein a layer of photoresist material is deposited on one of the substrates, said layer will then be structured by photo-etching techniques to give it the shape of one or several walls.

16. The method according to claim 14, wherein the photoresist layer is structured so as to form, not only the wall or walls, but also distance structures for maintaining a constant distance between the two substrates of the cell.

17. The method according to claim 15, wherein the photoresist layer is structured so as to form, not only the wall or walls, but also distance structures for maintaining a constant distance between the two substrates of the cell.

18. The method according to claim 1, wherein the sealing material is chosen from the group formed by resins that can be polymerised by sensitisation using a light or by heating by raising the temperature of the ambient medium, by thermoplastic resins, by cyanoacrylate adhesives and by dual component adhesives whose components harden over time or via the effect of a temperature increase when they are placed in the presence of each other.

19. The method according to claim 5, wherein the sealing material is chosen from the group formed by resins that can be polymerised by sensitisation using a light or by heating by raising the temperature of the ambient medium, by thermoplastic resins, by cyanoacrylate adhesives and by dual component adhesives whose components harden over time or via the effect of a temperature increase when they are placed in the presence of each other.

20. The method according to claim 1, wherein the contact bumps (20) are formed by galvanic growth.

21. The method according to claim 5, wherein the contact bumps (20) are formed by galvanic growth.

22. The method according to claim 20, wherein the contact bumps are made of gold.

23. The method according to claim 21, wherein the contact bumps are made of gold.

24. The method according to claim 1, wherein the contact bumps are made by selective printing.

25. The method according to claim 5, wherein the contact bumps are made by selective printing.

26. The method according to claim 24, wherein a resin charged with conductive particles is used.

27. The method according to claim 25, wherein a resin charged with conductive particles is used.

28. The method according to claim 26, wherein the resin is an epoxy adhesive.

29. The method according to claim 27, wherein the resin is an epoxy adhesive.

* * * * *